(12) United States Patent
Tiusanen

(10) Patent No.: US 9,835,084 B2
(45) Date of Patent: Dec. 5, 2017

(54) METHOD TO ARRANGE COMBUSTION AIR / COOLING AIR FOR AN ENGINE OR A MOTOR IN WARM INNER SPACE

(71) Applicant: JPTUF OY, Kangasala (FI)

(72) Inventor: Jukka-Pekka Tiusanen, Kangasala (FI)

(73) Assignee: JPTUF OY, Kangasala (FI)

( * ) Notice: Subject to any disclaimer, the term of this patent is extended or adjusted under 35 U.S.C. 154(b) by 68 days.

(21) Appl. No.: 14/182,472

(22) Filed: Feb. 18, 2014

(65) Prior Publication Data
US 2014/0230788 A1    Aug. 21, 2014

(30) Foreign Application Priority Data
Feb. 20, 2013    (FI) .................................... 20130060

(51) Int. Cl.
 *G01M 15/02*    (2006.01)
 *F24F 7/00*    (2006.01)
 *F02B 75/12*    (2006.01)

(52) U.S. Cl.
 CPC ............... *F02B 75/12* (2013.01); *F24F 7/00* (2013.01); *G01M 15/02* (2013.01)

(58) Field of Classification Search
 CPC ..... F24F 7/00; F24F 7/007; F24F 7/06; F02B 75/12; F28D 5/00; G01M 15/02
 See application file for complete search history.

(56) References Cited

U.S. PATENT DOCUMENTS

| | | | | |
|---|---|---|---|---|
| 5,944,860 | A * | 8/1999 | Mack ................. | B01D 46/0005 55/492 |
| 2005/0022521 | A1* | 2/2005 | Patry .................... | B08B 15/002 60/298 |
| 2005/0160740 | A1* | 7/2005 | Nakano .................... | F02C 7/12 60/796 |
| 2009/0203306 | A1* | 8/2009 | Sugata .................... | B60S 5/00 454/234 |
| 2009/0266525 | A1* | 10/2009 | Lambolez ......... | G01M 17/0074 165/121 |

* cited by examiner

*Primary Examiner* — Jacob Amick
(74) *Attorney, Agent, or Firm* — Ziegler IP Law Group, LLC

(57) ABSTRACT

A method and system to arrange combustion air for a combustion engine or cooling air for an electric motor that are situated in warm indoor space. A started combustion engine or a combustion engine to be started or the air intake equipment of an electric motor has in immediate closeness at least one air intake box where there is connected or will be connected an air channel that reaches the outdoor space and then the outdoor air flows through the air channel to the air intake box and further to the engine air intake equipment. The aspects of the disclosed embodiments are used in the air intake of the lorries, trailer trucks and busses and also power tools and the cooling air of the electric motors.

19 Claims, 2 Drawing Sheets

METHOD TO ARRANGE COMBUSTION AIR / COOLING AIR FOR AN ENGINE OR A MOTOR IN WARM INNER SPACE

FIELD

The aspects of the disclosed embodiments are directed to a method to arrange cooling air/combustion air for a motor in warm inside space, like for a combustion engine or electric motor. With the help of this method, a sufficient amount of combustion air/cooling air is conducted for its need for an engine that is located indoors.

BACKGROUND

The usage places for the aspects of the disclosed embodiments include vehicles that are equipped with a combustion engine and other engines and electric motors indoors, like in garages, storage spaces for vehicles, engine halls, power stations etc. Very useful objects for the aspects of the disclosed embodiments include lorries, busses, trailer truck prime movers and different power tools like for instance wheel loaders, fork lift trucks etc. The large electric motors are also advantageous places to use the aspects of the disclosed embodiments. The more combustion air or cooling air is needed the more useful it is for the use of the aspects of the disclosed embodiments. Especially, the cold start of the before mentioned engines is a situation where the method according to the aspects of the disclosed embodiments gives great advantage. When the engine is considerably cooler than the ordinary usage temperature (room temperature) its running speed is greater than the idle running. The starting of more than one of this kind of engines at the same time for instance in the morning is a very useful situation to use the aspects of the disclosed embodiments. The usage of the aspects of the disclosed embodiments is the more useful the greater the difference between the inside and outdoor temperature is.

The electric motors are useful places to use the aspects of the disclosed embodiments because they need cooling air during their run.

The combustion engines in the situations and places that have been mentioned before are started and operated nowadays so that the engine takes the combustion air directly from the warm room space. When an engine is started its air intake system sucks the room air near it to be used in the engine and then the substitute air to this space comes through all the possible gaps and openings. The open doors between the rooms and the gaps in the closed doors work as the flow routes for the air and thus heated indoor air comes even from a long distance inside the same building.

As we know that an ordinary lorry/truck prime mover turbocharged engine uses after its cold start during the greater than ordinary idle run air about 20-40 $m^3$/min, so three this kind of engines use during 5 minutes about 300-600 $m^3$ air. In practise, in this kind of situation air comes also through the gaps in the exterior walls but the greatest part of this kind of air is heated indoor air. If the situation that has been described is formed indoors with the dimension of about 10 m×10 m×4 m, the amount of the air that flows to the engines during that 5 minutes is even 1.5 times that whole volume.

Large electric motors require great amounts of air for cooling during their run. In the known technique, this air is taken from room air.

The before mentioned known technique is used commonly also in the air intake for combustion and cooling of the turbocharged engines of big volume (11-18 liters) and for cooling of electric motors.

When using the known technique major disadvantages occur. In the case of the combustion engines the greatest drawback can be seen to be the great energy usage they cause. In the northern countries, like for example Finland, a great part of the year it is so cold that the buildings need to be heated. As the heated room inside air and in many cased the neighbour room heated air flows to the combustion engines so that the substitute air during the cold periods of the year is cold outdoor air. The lost warmth energy means quite big costs because the rooms must be reheated.

Another clear drawback in the use of the known technique is that it causes air draught between the rooms. This drawback is encountered both in the case of the combustion engines and the electric motors. For instance there is a draught in the neighbouring office room. The draught weakens the comfort of the room and is also in many cases a health hazard. It is also a quite clear drawback that the office temperature goes down. If this kind of situation occurs repeatedly for instance every workday morning the situation can be very hard to tolerate and unhealthy for the people who work there.

The advantages of the aspects of the disclosed embodiments include obtaining a method to arrange such a combustion air/cooling air for the warm inside room located engine or motor that the drawbacks of the known technique can be avoided. It is characterizing for the solution according to the aspects of the disclosed embodiments what has been stated in the characterizing part of the claims.

In the same way, as the known technique has drawbacks and hindrances the usage of the method of the aspects of the disclosed embodiments has many advantages. The greatest advantage in comparison to the known technique is the saving of the energy. Once heated room temperature can be kept warm with a normal warming power and there is no need for another raise in the temperature of the room by directing heating to the cold substitute air. From the earlier stated example concerning combustion engines it can be derived that the amount of saved energy in that case is what is needed to heat about 400 $m^3$ of air to the desired room temperature. The amount of the raise of the temperature and thus the loss of energy depends on the outdoor temperature.

BRIEF DESCRIPTION OF THE DISCLOSED EMBODIMENTS

As described herein, the exemplary embodiments overcome one or more of the above or other disadvantages known in the art.

One aspect of the exemplary embodiments is directed to a method to arrange combustion air for an engine in warm indoor space, like a combustion engine or an electric motor. In one embodiment, the air intake equipment of a combustion engine to be started or that has been started or in connection of the air intake equipment of the cooling air for an electric motor, immediately close to them is arranged at least one air intake box whereto is fixed or will be fixed an air channel that reaches the outdoor air so that the outdoor air flows through the air channel to the air intake box and from there further to the air intake equipment of the combustion engine or to the cooling air intake of an electric motor.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The aspects of the disclosed embodiments are described in more detail in the enclosed drawings where.

DETAILED DESCRIPTION OF THE EXEMPLARY EMBODIMENTS OF THE DISCLOSURE

Figure 1:
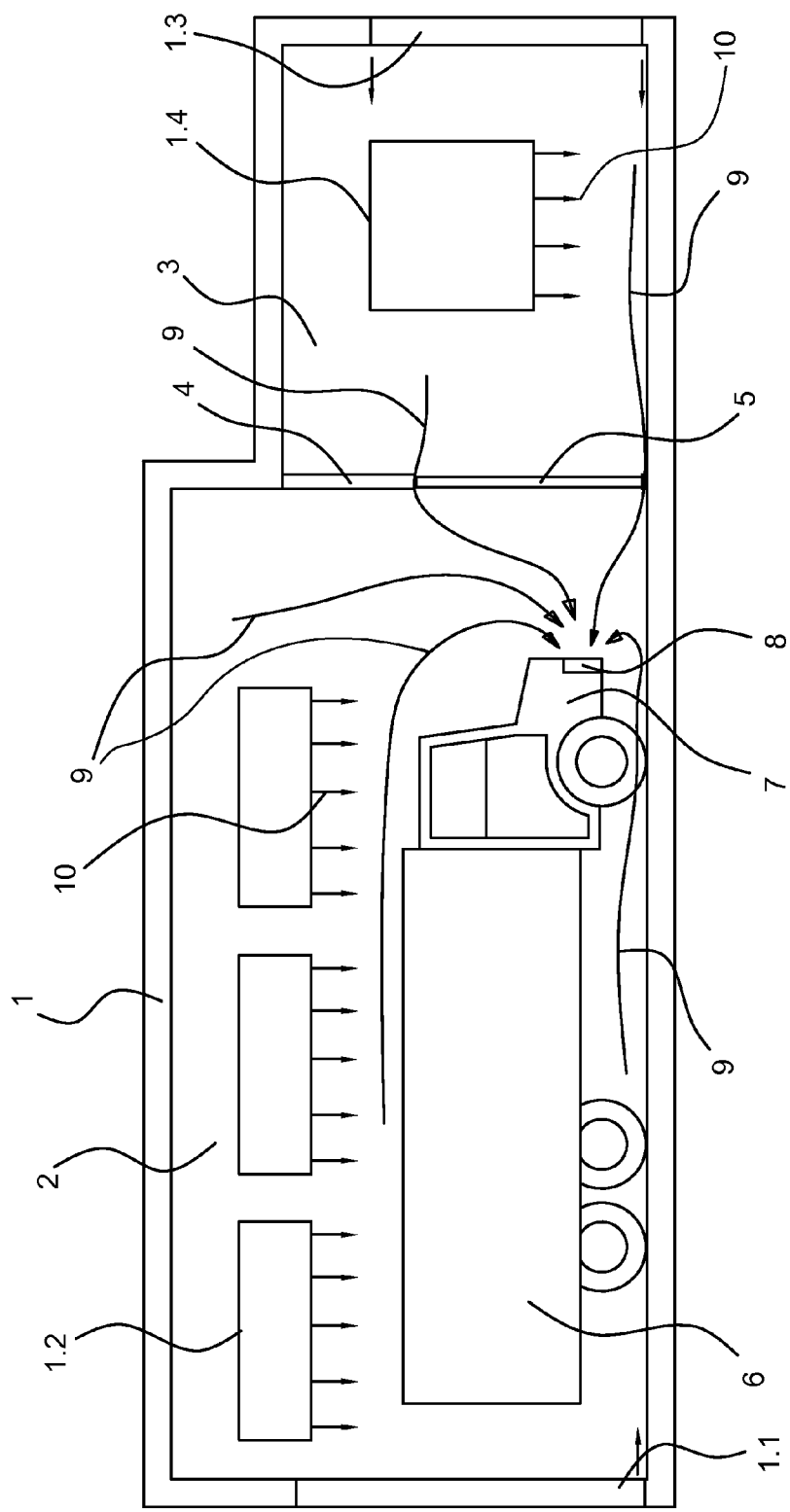
FIG. 1. presents a typical known technique method diagrammatically taking the combustion air for a lorry engine that is indoors.

In FIG. 1 there is a building 1 with two heated indoor spaces that are separated from each other by a partition wall 4, in other words the first and the second indoor space 2, 3. The first indoor space 2 is a room or a hall where a lorry 6 is kept and another indoor space 3 that is limited to it is an office room. There is a door 5 in the partition wall between these rooms. In the larger part of the building there are large entrance doors 1.1 and windows 1.4. When the combustion engines 7 of the lorries 6 are started in a cold morning using a method of the known technique, a warm air flow 9 from the first warm indoor space commences to get to the air intake equipment 8 e.g. air cleaner. At the same time, the suction of air to the engines 7 reaches also the other indoor space 3 and the heated air 9 of that space starts to flow through the partition wall 4 holes and gaps into the engines of the lorries. A vacuum that is created in the indoor spaces 2, 3 produces the substitute air flow 10 from outdoors to indoors through the substitute air velvets and the openings of the doors and the windows. The lorry engines consume during few minutes altogether or the greatest part of the warm air of the indoor spaces 2, 3 and cold substitute air flows from outdoors into indoors. The temperature of the indoor spaces goes down as the warmth energy of the indoor spaces moves to the engines 7. The cold air that comes in causes draught near the floor and even higher. The vacuum effect that the engines cause indoors can reach quite long and over numerous doors in which case the draught can bother a big multitude of people who are in the building 1.

Figure 2:
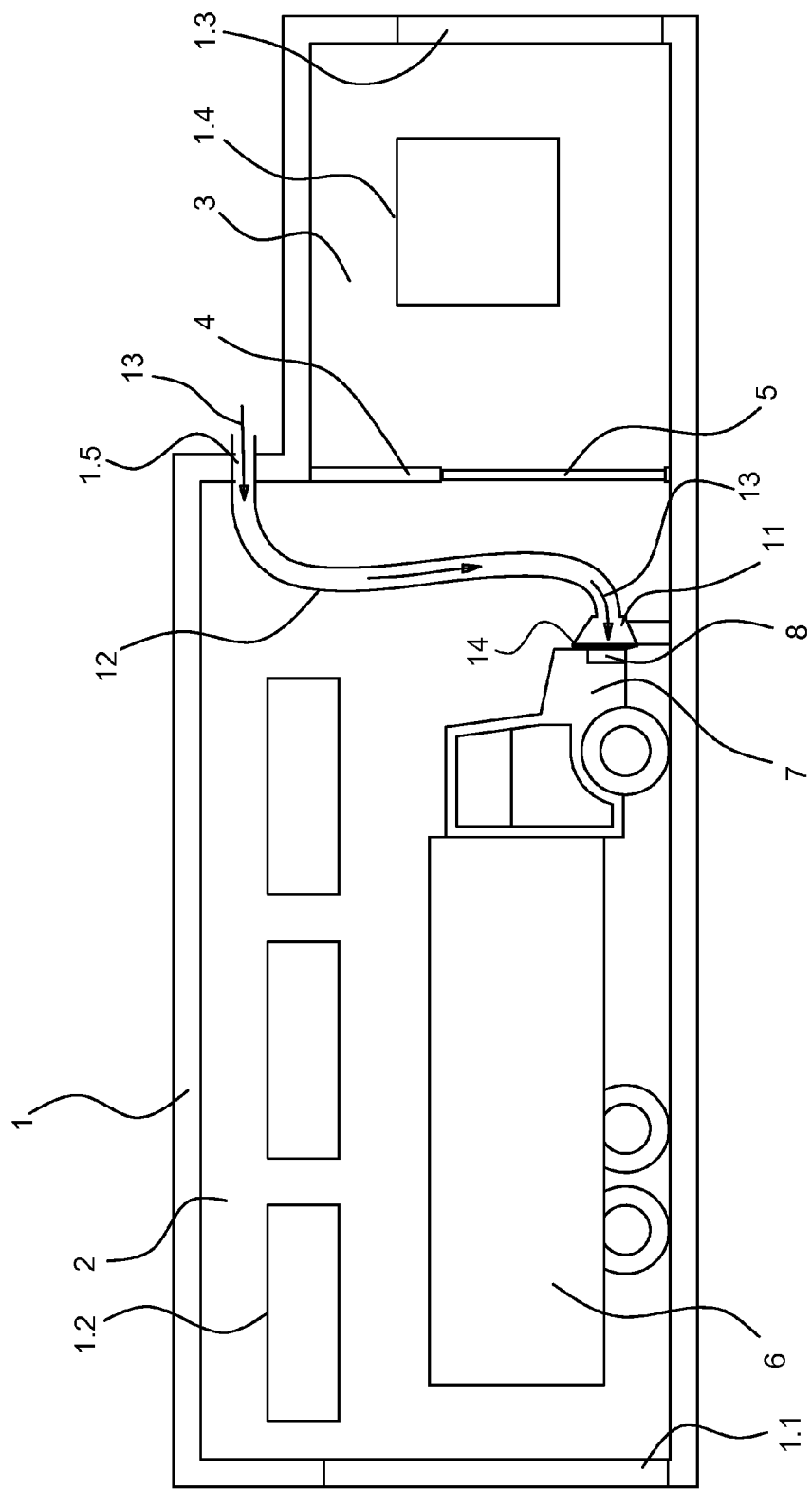
FIG. 2 is a diagrammatic presentation of using the method according to an aspect of the disclosed embodiments in the before mentioned situation.

Following is a description of the use of the method according to the aspects of the present disclosure in the before mentioned circumstances referring to the FIG. 2.

Near to the air intake equipment 8 of the engines of the lorries 6 there is a case like air intake box 11 that is open in the side of the engine and from this box an air channel 12 is led through a lead-out 1.5 in the wall of the first space 2 into outdoors. When the lorry engines 7 are started they get the major part of the combustion air 13 from outdoors through the air channel 12 and the air intake box 11. This method ensures that the warm air of the indoor spaces 2, 3 does not go into the engines and thus there will not be substitute air flow caused by a vacuum and there will not be temperature fall and draught either.

The method according to the aspects of the present disclosure can also be made using different kinds of air intake boxes 11 and air channels 12. The tighter the air intake box is installed to the engine air intake the better it can be avoided that the air gets mixed with the air that comes from the room and the total advantage is that much greater. A gasket 14 can be used to help to install the air intake box 11 tightly to the air intake equipment 8.

The air channel 12 can be a continuous channel or for example a combination of more than one hoses. It is central for this matter that the flow area coming to the engine 7 is of a suitable size. It can be dimensioned so that there will not be trouble of noise and on the other hand the production costs are reasonable.

The air intake box 11 can in some cases be also a part of the end of the air channel 12. In this case, it can be formed favourably so that it is fit for its use that is to say to conduct air to the air intake equipment 8. The air intake box 11 can also be equipped with the support elements, in which case it can be supported to its place during the use. As an example of this the following can be mentioned: A support rod construction from it to the indoor 2 floor that can also be equipped with wheels to make the moving easy. As another example it can be mentioned a support construction by hanging.

When the method according to the aspects of the present disclosure is used for the electric motors, an air intake box 11 is installed permanently near to the motor cooling air intake opening or it is moved there and the outdoor air is led there through the air channel 12 while the motor is running. This air flows through the motor and is released to the room air and thus the vacuum in the room is prevented and so there will not be any draught.

The method according to the aspects of the present disclosure can be used widely in connection of the vehicles, engines and electric motors. The larger the warm space is and the volume of the combustion engines is the more advantage is obtained by using the aspects of the present disclosure. The air intake equipment 8 can also be situated somewhere else than what is presented in FIG. 1 and FIG. 2. As an example of this kind or arrangement, an air intake opening at the end of a separate channel can be mentioned.

Both combustion engine and electric motor air intake using the method according to the aspects of the present disclosure can be made more efficient by suction in the channel and/or by using a fan. In this case, the suction fan/fan is installed in the air channel 12 or in connection of it favorably for its operation so that the air flow coming to the motor gets more efficient. This kind of suction fan/fan can be installed to the channels of every motor or into a greater channel that is divided later (in the flow direction) into smaller channels.

In new construction of a building a net of air channels 12 can be made in the building phase so that outside air can be supplied at the same time into numerous engines and motors. This kind of air channel net or a singular air channel 12 can also naturally be made in an existing building.

It should be noted that even though this explanation pertains to one kind of solution example that is favorable for the aspects of the present disclosure, this does not in any way limit the use of the aspects of the present disclosure only in this kind of solution, instead, many variations are possible within the inventive idea that has been defined in the claims.

What is claimed is:

1. A method of providing combustion air to a combustion engine of a vehicle disposed in a warm indoor space inside a building directly from an air supply external to the warm indoor space, the method comprising:
   providing an air intake box adjacent to an air intake equipment of the combustion engine;
   coupling an output side of the air intake box to a combustion air input of the air intake equipment of the combustion engine;
   coupling an input side of the air intake box to a first end of an air channel;
   coupling a second end of the air channel to an opening in a member of the warm indoor space, the opening fluidly coupled to the external air supply, wherein the external air supply flows into the second end of the air channel and through the air channel to the input side of the air intake box and directly into the air intake equipment of the combustion engine, wherein the external air supply is a sole source of combustion air to the combustion engine while the vehicle is disposed in the warm indoor space.

2. A method according to claim 1, comprising providing a gasket between the output side of air intake box and the air intake equipment of the combustion engine to form a seal between the air intake box and the air intake of the combustion engine.

3. A method according to claim 1, wherein the air intake box comprises the first end of the air channel.

4. A method according to claim 1, comprising providing a support member coupled between the air intake box and a floor portion of the indoor space, the support member configured to support the air intake box above the floor portion.

5. A method according to claim 1, wherein the combustion engine is a combustion engine of a lorry, trailer lorry or bus or machine.

6. A method according to claim 1, comprising providing more than one air channel wherein the external air is taken for more than one combustion engine in the same building either through separate air channels or through a united air channel network.

7. A method according to claim 1, providing a suction fan fluidly coupled to the air channel to increase a flow of air to the engines.

8. The method according to claim 1, wherein the air intake box is coupled to the air intake equipment of the combustion engine and a connection formed between the air intake box and the air intake equipment is sealed by a gasket, and wherein a major part of combustion air for the combustion engine when the engine is started flows from the air intake box into the air intake equipment of a combustion channel of the engine.

9. The method according to claim 8, wherein the air channel extends from the air intake box to a source of the outdoor air, the source being external to the indoor space.

10. The method according to claim 1, comprising separating air used as the combustion air for the combustion engine from air in the indoor space by extending the air channel to a source of the outdoor air that is external to the indoor space.

11. The method according to claim 1, comprising sealing the air intake box tightly to the air intake equipment so that air from the indoor space is not mixed with air flowing into the air intake equipment.

12. The method according to claim 1, comprising creating a suction in the air channel to draw air to the air intake box by using a fan in the air channel that draws the outside air into the air channel.

13. An air system configured to provide outside air directly to a motor of a vehicle that is disposed within a warm room of a building, the air system comprising:
   an air intake box with an output side fluidly coupled to a combustion air intake equipment for the motor;
   an air channel having one end coupled to an input side of the air intake box; and
   an air vent in a wall of the room, wherein an other end of the air channel is fluidly coupled to the air vent in the wall of the room, the air vent being coupled to a source of air external to the room, and wherein air from the source of air external to the room flows through the air channel to the input side of the air intake box and into the combustion air intake equipment for the motor, wherein the air external to the room is a sole source of combustion air to the motor while the air intake box is coupled to the air intake equipment.

14. The system of claim 13, wherein the air intake equipment of the motor is configured to draw the air external to the room through the air intake box and air channel and into the air intake equipment.

15. The system of claim 13, further comprising a fan disposed within the air channel that is configured to draw the air external to the room into the air channel and direct the air to the air intake box and into the air intake equipment of the motor.

16. The method according to claim 1 wherein the external air is a supply of cool outdoor air.

17. The method according to claim 16, wherein the opening is in a member that is configured to provide a physical barrier between the warm indoor space and the cold outdoor air.

18. The system according to claim 12, wherein the air external to the room is outside air that is cooler than air in the warm room.

19. The system according to claim 18, wherein the wall provides a physical barrier between the air in the warm room and the cooler air that is external to the room.

* * * * *